Feb. 15, 1955

C. G. HÅRD AF SEGERSTAD 2,702,227

RECORDING DEVICE WITH ACCUMULATOR ROLL

Filed Dec. 29, 1949

Inventor
Carl Gustaf Hård af Segerstad
by Sommers & Young
Attorneys

United States Patent Office 2,702,227
Patented Feb. 15, 1955

2,702,227

RECORDING DEVICE WITH ACCUMULATOR ROLL

Carl Gustaf Hård af Segerstad, Sandviken, Sweden, assignor to Sandvikens Jernverks Aktiebolag, Sandviken, Sweden Application December 29, 1949, Serial No. 135,593

Claims priority, application Sweden December 30, 1948

3 Claims. (Cl. 346—78)

The present invention relates to a device for determining the frequency of readings in various reading ranges of measuring instruments and the like which are sensitive to an arbitrary magnitude.

The principal feature of the invention consists in that an indicator is adapted intermittently to make records of its readings on to a sheet applied on a rotatable roller or an endless band or the like running over rollers, said band preferably being adapted to roll in contact with a movable recording strip of a kind known per se.

Other features and purposes of the invention will be apparent from the following specification when read in connection with the accompanying drawing in which two embodiments of the invention are diagrammatically illustrated by way of example.

Figure 1:
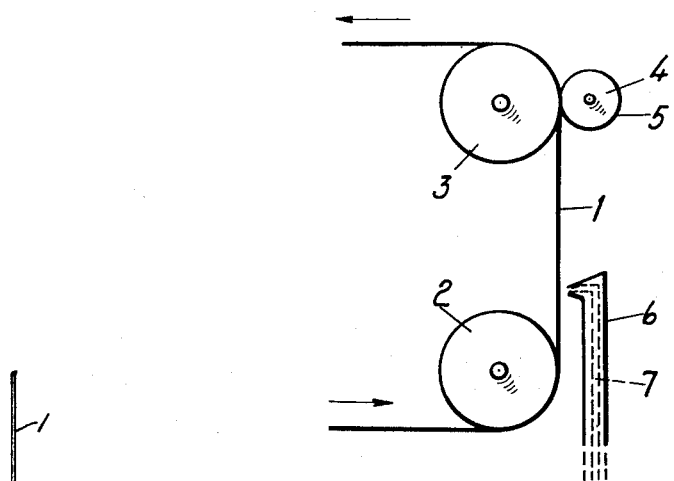
Fig. 1 is a diagrammatic side view of an exemplary embodiment of a recording machine according to the invention.
Figure 3:
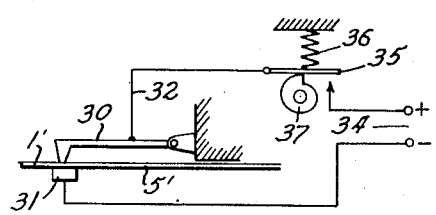
Fig. 3 is a diagrammatic side view on a reduced scale of apparatus for operating the pointer of Fig. 1.

In the drawing, the numeral 1 designates a recording strip of a measuring and recording instrument. The strip 1 is in a usual manner driven over rollers 2 and 3. 4 designates a roller around which is wrapped a sheet of paper, for example, blotting-paper, and which is adapted to roll in contact with the recording strip 1. Preferably the roller 4 is driven by the strip itself. The line of contact between the sheet 5 and the strip 1 may be situated somewhere between the rollers 2 and 3 or opposite to one or the other of them. 6 is the pointer or indicator of the instrument, which is movable transversely relative to the strip, that is, at right angles to the plane of the drawing by means of a usual moving coil measuring instrument, having a moving coil 11, and electromagnet 12 to which an electrical impulse $e_x$ representing the value to be recorded is supplied by the conductors 14, 15, the horizontal position to which the pointer is moved being dependent on the value $e_x$. The arm 10 is hingedly connected by a horizontal hinge 16 with a rearwardly extending arm 17 which is pivoted for horizontal swinging motion by pivot 27, mounted in fixed member 22, and arm 10, attached at its rear portion to moving coil 11. The two arms 10 and 11 are flexibly connected together by flat spring member 18 and the arm 10 and pointer 6 are normally pushed upwardly and backwardly by said spring member.

Figure 2:
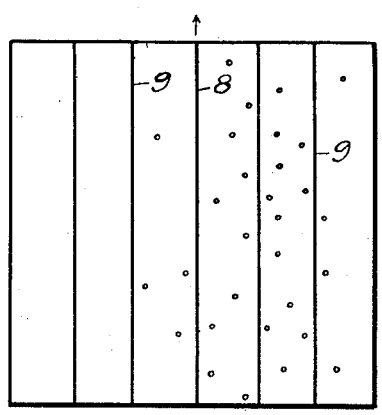
Fig. 2 is a front view of a portion of a recording strip showing markings thereon.

For bringing the pointer 6 into contact with strip 1, a drop yoke 20 is provided. The yoke is hinged for vertical motion at its rear end 21 to a fixed member 22, and its forward end 23 is positioned to bear downwardly on arm 10 to swing it downwardly about its hinge 16 with yielding of spring member 18, which action brings pointer 6 into contact with strip 1. Drop yoke 20 is controlled by a cam device 24 through rod 25 engaging said cam with one of its ends and drop yoke 20 with its other end. Cam device 24 is actuated by a shaft 26 driven by a motor (not shown). The pointer 6 is provided with an ink canal 7 from which an ink record is applied onto the strip 1 at each contact with the pointer. The ink is such that it is not yet dry when it arrives at the roller 4 and therefore applies a point of ink on the sheet 5. All the points on the strip 1 are thus transferred to the said sheet, as shown in Fig. 2. As will be seen from this figure, the sheet is provided with a zero line 8 and a number of additional lines 9 indicating negative and positive pointer readings of various values. When the time has elapsed, for which a statistical investigation of the reading frequency in various reading ranges is desired, the sheet 5 is removed and the number of records or points between the lines of the sheet can be counted.

Figure 4:
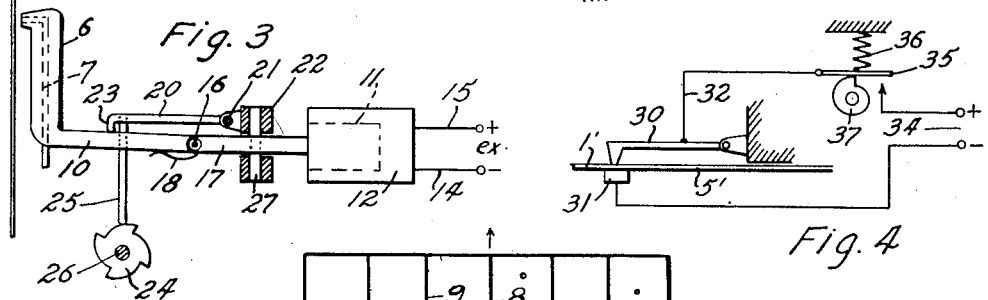
Fig. 4 is a diagrammatic side view of another embodiment.

In another embodiment represented diagrammatically in Fig. 4, a pointer 30 remains continually in contact with the strip 1', the said strip and recording sheet 5' being prepared so as to be colored at points where electric current passes through. On the opposite side of strip 1' and sheet 5' from pointer 30 is located an electrode 31. The pointer 30 and electrode 31 are connected in electric circuit 32 with source of current 34 so as to cause current to flow through strip 1' and sheet 5' when the circuit 32 is closed by switch 35 under the influence of spring 36, and control of cam 37.

Having now described my invention, what I claim as new and desire to secure by Letters Patent is:

1. Apparatus for recording the frequency of readings located in various ranges comprising a substantially endless recording strip, means for moving said strip past an intermittently recording point, means for intermittently influencing said point to make relatively short markings on said strip, an implement for applying records on said strip in positions having significance with respect to the readings represented by the records, and a second recording endless strip, a rotatable roller around which said second strip is arranged, said roller holding said second strip against said first strip so as to continually apply the portions of the second strip to the first strip so that the second strip accumulates in concentrated arrangements the record applied to the first strip.

2. Apparatus according to claim 1 and in which the second strip is fastened on the rotatable roller around its circumference.

3. Apparatus according to claim 1 and in which the second strip is provided with circumferential marking delineating zones, representing readings of various values.

References Cited in the file of this patent

UNITED STATES PATENTS

| | | |
|---|---|---|
| 2,098,689 | Masson | Nov. 9, 1937 |
| 2,384,515 | Wise | Sept. 11, 1945 |